C. F. THAYER.
VEHICLE WHEEL.
APPLICATION FILED JUNE 30, 1913.
1,197,685.  Patented Sept. 12, 1916.
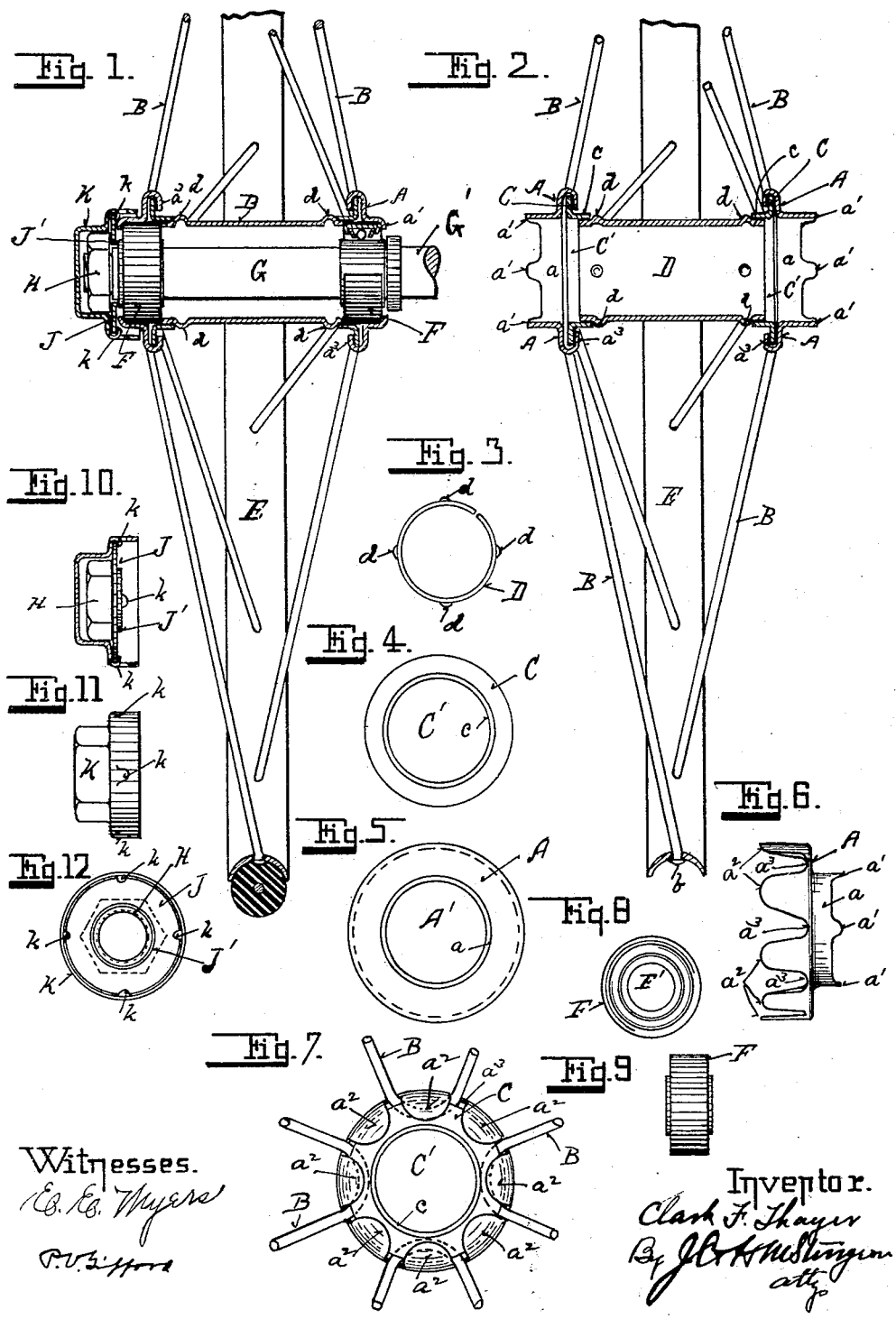

UNITED STATES PATENT OFFICE.

CLARK F. THAYER, OF ERIE, PENNSYLVANIA.

VEHICLE-WHEEL.

1,197,685.  Specification of Letters Patent.  Patented Sept. 12, 1916.

Application filed June 30, 1913. Serial No. 776,609.

*To all whom it may concern:*

Be it known that I, CLARK F. THAYER, a citizen of the United States, residing at Erie, in the county of Erie and State of Pennsylvania, have invented certain new and useful Improvements in Vehicle-Wheels; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention relates to vehicle wheels in which the hub is constructed from a plurality of parts formed and pressed from sheet metal which are held in their assembled positions by means of the wheel-rim and the spokes of the wheel; and the object of my invention is to provide a means whereby the axle-bearings may be removably secured in the hub of the wheel after the wheel is tinned or enameled, so said bearings may be removed therefrom when worn out, and re-placed with new bearings. In the manufacture of vehicle wheels of this type it is the usual shop practice to dip them in liquid enamel after which they are placed in a drying oven and baked until the enamel is hard; and when they are tinned instead of enameled, they are dipped in molten tin. In either the dipping would permit the enamel or tin to enter into the axle-bearings, and in case said bearings are of the anti-friction type, render such bearings inoperative, and further would render them un-removable in case it becomes necessary to replace them with new bearings. To overcome these difficulties, I have devised a wheel having a hub-sleeve formed from sheet-metal, upon the ends of which are telescopically placed spoke-fastening members formed of two parts secured together by over-lapping ears, which are pressed out of sheet-metal, and I provide on the outer ends of said spoke-fastening members small ears. The spoke retaining members are retained from slipping off of the ends of the hub sleeve by the spokes of the wheel which are prevented from spreading, by being secured in the rim of the wheel. After the wheel thus formed, has received its exterior finish, I place within the spoke fastening members, axle-bearings which engage the ends of the hub-sleeve so that their inward movement is limited thereby, and the small ears on the outer ends of the spoke fastening means are bent over the outer ends of said axle-bearings, thus holding them securely against the ends of the hub-sleeve; but if it is desired, said ears may be opened to permit the removal of said bearings.

The features of my invention are hereinafter set forth and are fully explained and illustrated in the accompanying drawings, in which:—

Figure 1, is a transverse, vertical section of a wheel provided with my improved hub and nut covering, showing the anti-friction bearings therein. Fig. 2, is a like view of the vehicle wheel without anti-friction bearings. Fig. 3, is an end view of the hub sleeve. Fig. 4, is a side elevation of the flange ring composing part of the wheel hub. Fig. 5, is an outside elevation of the scalloped ring forming part of the wheel hub. Fig. 6, is a side or edge-wise elevation of the same. Fig. 7, is a side elevation of one end of my improved hub, looking at the inside surface thereof, after the same has been removed from the hub sleeve, showing the manner of securing the spokes therein. Figs. 8, and 9, are side and edge-wise elevations of the anti-friction bearing removed from the end of the wheel hub.

In these drawings A, indicates a ring of flat metal, (see Figs. 5 and 6) provided with a central opening A', around which opening a cylindrical flange $a$, extends outwardly from the face of the ring A. Said flange $a$, being provided with ears $a'$, on the edge thereof, for the purpose hereinafter set forth. Around the periphery of the ring A, and projecting over the opposite face thereof, are ears $a^2$, of such dimension as to leave sufficient space $a^3$, between the edges of said ears, to admit the wheel spokes B, (see Fig. 7) thereinto as hereinafter described. I then place the wire spokes B, which are preferably of the type known as hair-pin spokes, as shown by full and broken lines in Fig. 7, in the notches $a^3$, between the ears $a^2$, on the ring A. I then provide another flat metal ring C, having a central opening C', of a size equal to the opening A', in the ring A, and provide a cylindrical flange $c$, around said central opening. This ring C, shown in Fig. 4, is then placed within the ears $a^2$, on the ring A, and against the spoke wires therein, and I then bend the ends of the ears $a^2$, inwardly over the periphery of the ring C, so that the spoke wires B, are firmly clamped between the ring A, and the ring C. I then place one of the spoke fastening means with its spokes B, secured therein as above described upon each end of a hub-sleeve D, and secure them in place thereon by inserting the outer ends of the spokes B, in openings provided therefor in the wheel-rim E, and riveting heads b, thereon, as shown in Figs. 1 and 2, the hub-sleeve being provided with radial projections d, adjacent to each end thereof adapted to be engaged by the flanges c, on the ring C, when the sleeve is inserted into the opening C', in the ring C, as shown in Fig. 2, for the purpose of preventing the sleeve D, from entering too far in the said ring. The outer ends of the spokes B, are then secured in the wheel rim, E, by means of heads b, being formed thereon in the usual manner.

The construction shown in Fig. 2, having been assembled as hereinbefore described, is now ready to receive its coat of tin or paint, which is applied thereto by dipping the wheel shown in Fig. 2, into a vat containing the material of which said finish is composed, and it can be readily understood that said material at once enters into all the openings and crevices in the structure. The construction of the anti-friction bearings shown in Figs. 8 and 9, form no part of this invention, but can be purchased in the required sizes from manufacturers who make a specialty of the same.

Into the openings A', in the rings A, at each end of my improved wheel hub, I insert self-contained anti-friction bearings F, having cylindrical openings therethrough, F', (see Figs. 8 and 9) for the reception of the spindle G, of the carriage axle G', until the inner surface of said anti-friction bearings F, contacts with the ends of the sleeve D, and then bend the ears a' (see Fig. 6) inwardly over the outer faces of the anti-friction bearings F, thereby securing said bearings firmly within the ends of the wheel hub (see Fig. 1). I then insert the spindle G, of the carriage axle through the openings F', in the bearings F, and secure the same thereon by means of a nut H. For covering the nut H, so as to keep dust out of the bearings, and to render the same smooth and neat in appearance, I provide a washer J, having a central opening therethrough, around which is provided a flange J', adapted to contact with the outer surface of the anti-friction bearing in the outer end of the wheel hub; this washer J, being of a diameter slightly in excess of the diameter of the cylindrical flange a, on the ring A. I then provide a cup-shaped covering K, for the nut H, having an internal form adapted to fit the nut H, and extend outwardly over and receive the washer J, and the end of the flange a, on the end of the hub. The covering K, is also provided with ears k, adapted to be bent inwardly over the periphery of the washer J, so as to retain the washer J, and the nut H, within said covering K, the open end of said covering K, being of sufficient depth to extend inwardly over the flange a, to a point adjacent to the ring A.

Having thus shown and described my invention so as to enable others to construct and utilize the same, I do not desire to be limited to the exact construction shown, and described herein, and what I claim as new and desire to secure by Letters Patent is:—

The combination in a vehicle wheel, consisting of the usual rim, spokes and hub, said parts having received their exterior finish of tin, paint or enamel, journal bearings inserted into the ends of the wheel hub, and portions of the finished hub bent over the outer ends of said bearings, substantially as set forth.

In testimony whereof I affix my signature, in presence of two witnesses.

CLARK F. THAYER.

Witnesses:
S. H. DROWN,
E. E. MYERS.

Copies of this patent may be obtained for five cents each, by addressing the "Commissioner of Patents, Washington, D. C."